Jan. 8, 1924.  1,479,828
J. MORRISON
SEMITRAILER
Filed Dec. 20, 1919  2 Sheets-Sheet 2
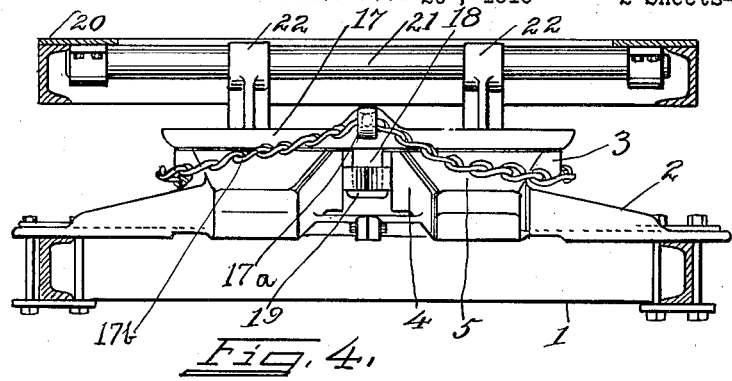
Fig. 4.
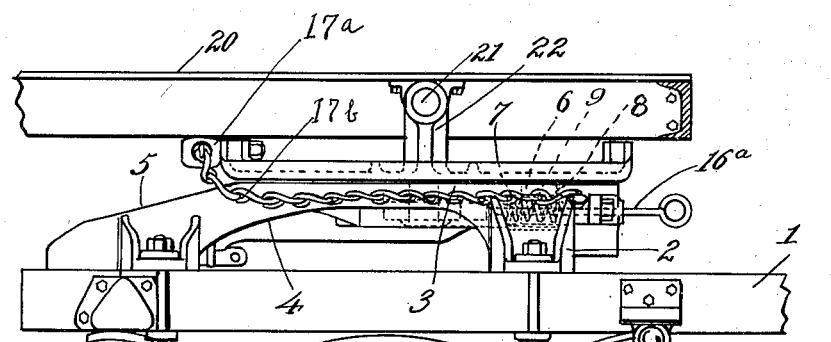
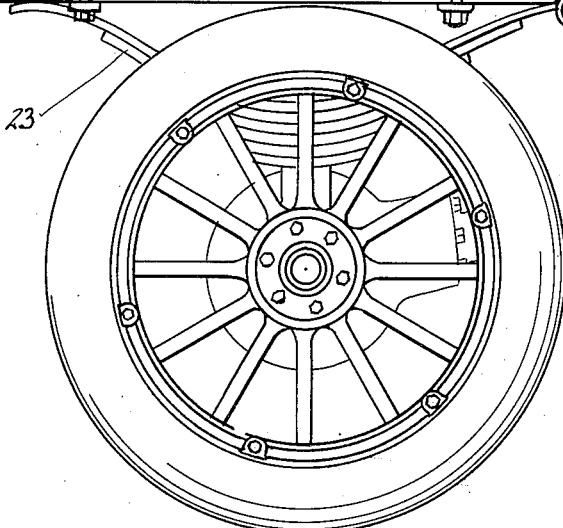
Fig. 5.
Inventor:
James Morrison
By Allen & Ellen
Attorneys.

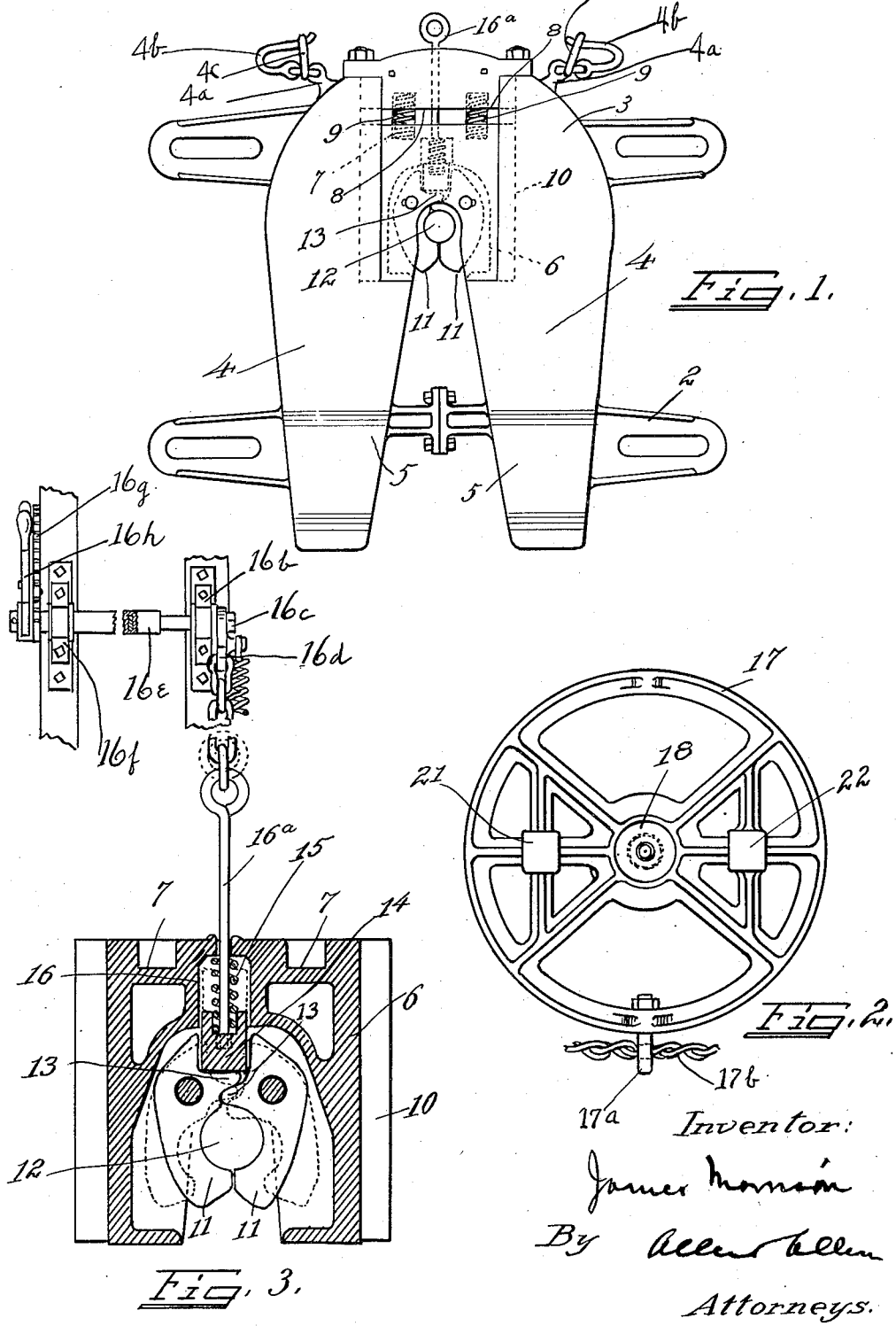

Patented Jan. 8, 1924.

1,479,828

UNITED STATES PATENT OFFICE.

JAMES MORRISON, OF CINCINNATI, OHIO, ASSIGNOR TO THE TRAILMOBILE COMPANY, OF CINCINNATI, OHIO, A CORPORATION OF OHIO.

SEMITRAILER.

Application filed December 20, 1919. Serial No. 346,330.

*To all whom it may concern:*

Be it known that I, JAMES MORRISON, a citizen of the United States, and a resident of the city of Cincinnati, in the county of Hamilton and State of Ohio, have invented certain new and useful Improvements in Semitrailers, of which the following is a full, clear, and exact description, reference being had to the accompanying drawings, forming a part of this specification.

My invention relates to semi-trailer vehicles, and particularly to the means of connection between the tractor vehicle and the trailer vehicle.

The term semi-trailer has been applied to the type of vehicle in which the tractor supports the front end of the trailer thereby doing away with front wheels for the trailer, and actually supporting part of the load on the tractor itself. The art as developed in such vehicle arrangements, has demonstrated the value thereof both for economic hauling and for efficient distribution of loads.

It is the object of my invention to provide a fifth wheel device for coupling and supporting the trailer on the rear end of a tractor which allows for longitudinal play of the two vehicles with relation to each other, and for a tilting of the trailer with regard to the tractor.

Among other things, instead of providing for a sliding type of fifth wheel, I provide in connection with an automatic coupler feature, for a resiliently retained box for the coupler, which will take up the jars incident to starting and stopping the tractor. In this way I entirely avoid the necessity for a cumbersome pivot structure and long heavy springs, such as are found in sliding fifth wheels, and from one point of view I provide a resilient coupling between two fifth wheel plates such that the plates may slide with relation to each other as well as rotate.

These objects and other advantages to be noted, I accomplish by that certain construction and arrangement of parts to be hereinafter more specifically pointed out and claimed.

In the drawings,

Figure 1 is a top plan view of the tractor plate or bolster.

Figure 2 is a top plan view of the trailer fifth wheel plate.

Figure 3 is a detail section taken through the sides of the coupler box showing the coupler jaws.

Figure 4 is a rear elevation of the fifth wheel device.

Figure 5 is a side elevation thereof.

Bolted fast to the tractor frame 1 by means of arms 2, is the tractor plate or bolster 3. This plate has two rearwardly extending tapered legs 4, 4, which slope downwardly at the ends at 5, 5. Running from the crotch of the two legs in this bolster is a suitable chamber or depression 8 in which is slidably set a casting or coupler box 6. This box has sockets 7, 7, at its inner edge and the wall of the chamber 8 has like sockets for the reception of spring 9, 9. The plate slides in the casting on dovetailed ribs 10 which engage suitable grooves in said casting.

As so constructed it is obvious that the casting or box can slide with relation to the bolster, and that the springs take up this longitudinal sliding motion, making it resilient.

Pivoted in suitable recesses in the box are two jaws 11, 11, which when closed form a circular hole 12, that receives the depending king pin from the upper fifth wheel plate. The jaws have nibs 13, 13, which, when the jaws are open, will contact with a king pin moving inwardly toward the pivot of the jaws, thereby causing the jaws to close.

The rear ends of the jaws are spaced so that a plunger 14 which is rectangular in shape, can lie between them, thereby preserving the closed position of the jaws. The plunger is spring-controlled by a coiled spring 15 seated in a socket 16 of the couple box or casting, and an operating rod $16^a$ extends from the said plunger, through the spring, and the inner end of the bolster, so that it can be operated from the driver's seat.

As a means for operating the plunger, I provide preferably a round casting (not shown) which lies inside of a journal box $16^b$ on the tractor frame, behind the cab thereof. The center of this casting is squared, to receive fixedly a squared bar $16^c$. On the inner end of the squared bar is a crank $16^d$, for operating the plunger, and on the other end thereof, the bar is received slidably in a hollow shaft $16^e$.

The shaft $16^e$ is, of course, squared interiorly to receive the bar, and is itself mounted in a casting (not shown) mounted in a journal box 16$^f$, at the side of the tractor frame.

On the outer end of the shaft 16$^e$ is mounted a lever 16$^h$, which carries any desired form of spring dog, said dog working over a toothed segment plate 16$^g$. This lever is moved by the operator of the tractor from his seat in the usual manner, and the whole construction is one which will be adapted for mounting on tractors of varied widths, since the connections are extensible, as is obvious from the above description.

The trailer fifth wheel plate 17 from which depends a king pin 18, flanged at its lower end at 19, is suspended from the trailer frame 20. The preferred means for providing this suspension is a shaft 21 extending crosswise of the forward end of the trailer, and a pair of bosses 22, on the upper side of said fifth wheel plate.

When the tractor and trailer are coupled together, and in order to safeguard the coupling from coming loose in service, I provide a safety chain to be manually set.

At the rear of the trailer fifth wheel plate is a large eye 17$^a$, through which passes a chain 17$^b$. The tractor bolster or fifth wheel plate is provided with two eyes 4$^a$, 4$^a$, in which are set hooks 4$^b$, 4$^b$, said hooks having closing loops 4$^c$.

The chain is brought forwardly, after the parts have been coupled, and set over the hooks 4$^b$, after which the loops 4$^c$ are set. If desired, the chain can be brought down around the arms 2 of the bolster member, and it does not need to be tight, in order to safeguard the pulling of the two vehicles apart.

The combination of a fixed tractor bolster and a journaled fifth wheel for a trailer, in a device of the character herein, in connection with a safety chain strung slidably through one part and brought around and secured to the other part of the fifth wheel, provides a perfectly secure, and yet freely movable connection between the two vehicles.

In coupling the two vehicles together the tractor is backed under the trailer which may be held on suitable horses or jacks at its forward end, so that the king pin member will enter the converging space between the two legs of the bolster. At the same time the plate 17 will strike the inclined surface of the legs and will tip up and ride upward on to the main or level surface thereof, lifting the trailer from its jacks.

The king pin will be guided to the jaws of the coupler and the plunger being out of the way and the jaws open, the pin will strike the nibs of the jaws and cause them to close, after which the plunger will automatically lock the jaws closed.

The jar incident to the coupling will be taken up by the spring of the coupler box, and the stopping of the tractor while coupled will also be taken up thereby. The upper fifth wheel plate will slide along the lower fifth wheel or bolster plate during these longitudinal thrusts, and will turn thereon during the operation of the tractor whenever necessary.

The journal for the upper fifth wheel plate will permit the longitudinal tipping of the trailer with relation to the tractor, and so far as shown my mechanism takes up the rocking or wallowing of the trailer on the rear springs 23 of the tractor.

I do not wish my claims that follow to be limited to the exact structural details above set forth, due to my failure to point out alternative structures which would accomplish like mechanical results in a well known way.

Having thus described my invention, what I claim as new and desire to secure by Letters Patent is:—

1. In a semi-trailer device, the combination with the tractor and the trailer, of fifth wheel members for said two vehicles, both of said members having plain surfaces to contact with each other, automatic coupling means adapted to couple said two fifth wheel members together, said means comprising a pin and a box having pin engaging jaws therein, said box being longitudinally slidable and spring controlled with relation to one of the members.

2. In a semi-trailer device, the combination with the tractor and the trailer of fifth wheel members mounted on the two vehicles and adapted to contact with each other and coupling mechanism intermediate said two members, said coupler mechanism being resilient with relation to one of the two members for the purpose described, and comprising a resiliently retained box member slidable longitudinally of the vehicle on which it is mounted, and a pair of pivoted jaws mounted therein located on one of said fifth wheel members, and a king pin on the other of said fifth wheel members, to be engaged by said jaws.

JAMES MORRISON.